Patented May 18, 1926.

1,584,965

UNITED STATES PATENT OFFICE.

EDMUND H. WINTER, OF BEMIDJI, MINNESOTA.

TREATMENT OF PEAT AND PRODUCT THEREOF.

No Drawing.  Application filed April 3, 1925. Serial No. 20,545.

This invention relates to treatment of peat in the making of products that are readily and efficiently usable as fuel and for other purposes.

It is an object of the invention to produce from peat, without the necessity of subjecting the material to expensive drying operations, a fuel that is hard and dense, that may be crushed and graded to any desired size in substantially the same manner and with substantially the same type of machines as are used in the preparation of anthracite coal for the market, and that is ready for consumption after a period of curing that is much shorter than that ordinarily required for converting peat to a condition suitable for combustion.

The invention also provides for the production from peat of material that is suitable for heat-insulation and other purposes.

In performing the process in accordance with this invention, peat taken directly from a bog or from a stock pile is run through a macerator, disintegrator, or like machine, and in the machine the material is mixed with a caustic substance, such as, for example, calcium in the oxide or hydroxide form; an amylose carbohydrate, such as, for example, commercial starch or cereal flour or other suitable material containing starch; an alum, such as, for example, common alum; an oxidizer or nitrate, such as, for example, saltpetre, either Chili saltpetre (sodium nitrate) or saltpetre (potassium nitrate); and a saccharose or glucose carbohydrate, herein referred to as sugar material, such as contained in corn-sugar, confectioners' glucose, sugar-refinery refuse molasses, refuse honey, and the like, any of which may be employed preferably because they are cheap, but cane-sugar can be used. The terms "sugar" and "sugar material" are employed herein to include any of the suitable sweet or sweetish carbohydrates of the glucose and saccharose groups, and it is not the intention to designate merely sucrose or cane sugar.

These ingredients may be added in dry or their natural form, as the large quantity of water contained in peat furnishes enough moisture for the chemical reactions that may take place in the mass. However, it is preferably to introduce them in the form of aqueous emulsions and solutions, because only comparatively small quantities are required for a given amount of peat, and in emulsions and solutions they more readily become thoroughly disseminated throughout the mass.

Although various materials of the classes mentioned, within limitations as to cost, availability, and other factors, may be mixed with the peat and more or less satisfactory results obtained, it has been found in practice that products that meet the purposes for which they are intended can be made economically and expeditiously by carrying on the process in the following manner with materials as stated.

Milk of lime as a readily-flowing emulsion, an aqueous emulsion of starch and alum, an aqueous solution or mixture of saltpetre, and a sugar material mixed with water, are added to the peat, as and while it is being introduced into the macerator or similar machine, and thoroughly mixed therewith.

These substances may be mixed all together with water just before introduction into the peat; but, owing to the reactions that would occur among some of them while mixing and during the period of pouring into the macerating and mixing machine, it is preferable to keep the lime emulsion separate from the others until it is brought into contact with the peat. The other emulsions or solutions also may be introduced separately, or before introduction the saltpetre may be added to the mixture of starch and alum, and the sugar material may be added to that mass.

The quantities and proportions of the treating substances are dependent upon the character of the peat used and other factors pertaining to production, which may vary. It has been found in practice, however, that the following quantities are sufficient to treat about 8,000 pounds of good-quality wet peat under conditions ordinarily pertaining to the manufacturing operations: High-grade quick-lime, approximately 40 pounds; starch, approximately 10 pounds; alum, approximately 1 pound; saltpetre, approximately 2 pounds; corn-sugar or confectioners' glucose, approximately 12 pounds.

From the machine in which the materials are mixed the mass is passed through a machine in which it is ground and mixed, and it goes thence through another machine, such as a pug-mill, for example, in which it is subjected to further mixing or agitation and from which it is extruded as an elongated plastic mass of any desired and suitable cross-sectional shape that is cut into lengths, which then are transferred to a suitable place for exposure to air drying. Open sheds such as used for exposure of ceramic material to the atmosphere for drying are suitable. No artificial drying is required.

During the period of curing in the atmosphere, the product shrinks and solidifies to density and hardness, and it does not break readily. It affords a fuel that burns without formation of clinkers and without slaking, it is practically smokeless, it cokes without slaking, it is free of appreciable amounts of sulphur, it is substantially dustless, and it is practically non-absorbent of moisture.

It has been found that treatment of peat in the manner described gives a product of that nature, and that the almost insurmountable problem of expelling water retained in the cellular structure of peat by mechanical means and the expense of using artificial heat for that purpose have been avoided.

The exact nature of the reactions and other changes that may take place in the mass as a result of association of the treating substances with the peat and with the acids inherent therein is not known, and it is immaterial. It is assumed, however, that the lime assists in breaking down the cellular structure of the peat and thus releases moisture, and that it acts as an acid neutralizer; that the starch adds to the natural colloidal properties of the peat, contributes to certain ferments, and possibly absorbs some oils of the peat; that the alum has some astringent action, deters destruction of colloidal properties by the lime, and possibly assists in ferment; that the nitrate assists the lime in release of moisture, acts as an oxidizer, and adds to combustibility; and that the sugar material aids ferments, and causes the product to dry from the inside out.

Much of the water apparently is taken up in chemical combinations remaining in the mass, and much of its elements probably goes off as gas, and thus the amount of free moisture it is necessary to dry out to bring the product to a condition requisite for efficient combustion is reduced materially.

It has been found that by lessening the quantities of treating substances applied to a given amount of peat, and particularly by lessening the quantity of lime and reducing the amount of maceration, a lighter product results, which when broken up can be used in place of cork and the like for heat-insulation purposes, packing, etc. When the product is to be used for such a purpose, the nitrate may be omitted, because less oxidation is required than for fuel, although a longer time for curing is needed without that substance.

Having thus described my invention, what I claim as new, and desire to secure by Letters Patent, is: —

1. A process of making a product from peat that includes mixture therewith of lime, starch, alum, nitrate, and sugar, and curing the resultant by exposure to air.

2. A process of making a product from peat that includes mixture therewith of an alkaline earth caustic, an amylose carbohydrate, alum, an oxidizer, and sugar, and curing the resultant by exposure to air.

3. A process of making a product from peat that includes maceration thereof and mixture therewith of lime, starch, alum, nitrate, and sugar, and curing the resultant by exposure to air.

4. A process of making a product from peat that inclues maceration thereof and mixture therewith of an alkaline earth caustic, an amylose carbohydrate, alum, an oxidizer, and sugar, and curing the resultant by exposure to air.

5. A process of making a product from peat that includes mixture therewith of lime, starch, alum, and sugar, and curing the resultant by exposure to air.

6. A process of making a product from peat that includes mixture therewith of an alkaline earth caustic, an amylose carbohydrate, alum, and sugar, and curing the resultant by exposure to air.

7. A process of making a product from peat that includes maceration thereof and mixture therewith of lime, starch, alum, and sugar, and curing the resultant by exposure to air.

8. A process of making a product from peat that includes maceration thereof and mixture therewith of an alkaline earth caustic, and amylose carbohydrate, alum, and sugar, and curing the resultant by exposure to air.

9. A product of the class described containing resultants of mixing together and curing peat, lime, starch, alum, nitrate, and sugar.

10. A product of the class described containing resultants of mixing together and curing peat, an alkaline earth caustic, an amylose carbohydrate, alum, an oxidizer, and sugar.

11. A product of the class described containing resultants of mixing together and curing peat, lime, starch, alum, and sugar.

12. A product of the class described containing resultants of mixing together and curing peat, an alkaline earth caustic, an amylose carbohydrate, alum, and sugar.

In testimony whereof I affix my signature.

EDMUND H. WINTER.